3,117,909
Patented Jan. 14, 1964

3,117,909
DI-SUBSTITUTED NAPHTHALENES AS FUNGAL GROWTH INHIBITORS
John D. Douros, Jr., Westchester, Pa., Richard L. Raymond, Wilmington, Del., and John J. Melchiore, Wallingford, Pa., assignors to Sun Oil Company, Philadelphia, Pa., a corporation of New Jersey
No Drawing. Filed Jan. 22, 1962, Ser. No. 167,886
16 Claims. (Cl. 167—32)

This invention relates to certain di-substituted aromatic hydrocarbons which inhibit the growth of fungi and yeasts including mildew causative microorganisms.

More particularly this invention concerns methods of protecting materials subject to attack by fungi for extended periods of time through the application of certain di-substituted naphthalenes.

These fungi growth inhibitors are di-substituted naphthalenes in which the substituent pairs are selected from the group consisting of hydroxy and hydroxyalkyl, hydroxy and carboxy, hydroxy and formyl, hydroxy and alkyl ester, hydroxy and alkyl, dihydroxy, dihydroxyalkyl, hydroxyalkyl and carboxy, hydroxyalkyl and formyl, hydroxyalkyl and alkyl ester, hydroxyalkyl and alkyl, carboxy and alkyl ester, carboxy and alkyl and dicarboxy. Also included are the salts of carboxy naphthalene and the oxides of hydroxynaphthalene.

Throughout this disclosure the alkyl, hydroxyalkyl, and carboxy substituents have 1 to 6 carbon atoms, branched or unbranched, joined or conjoined.

The term "oxides" as used throughout this disclosure refers to those compounds produced when the hydrogen atom of a hydroxy or hydroxyalkyl substituent is replaced by a metallic ion such as sodium, an ammonium ion or substituted ammonium ion such as ethylammonium and the like.

Illustrative examples of the fungi and yeast growth inhibitors of this invention include:

6-hydroxymethyl-1-hydroxynaphthalene and 7-hydroxymethyl-2-hydroxynaphthalene,
5-hydroxy-1-carboxynaphthalene and the sodium salt of 3-hydroxy-2-carboxynaphthalene,
1,2-dihydroxynaphthalene,
8-formyl-1-hydroxy- and 4-formyl-1-hydroxynaphthalene,
7-hydroxy-2-ethylnaphthoate,
6-methyl-2-ethylnaphthoate,
6-hydroxymethyl-2-carboxy- and 8-hydroxyethyl-1-carboxynaphthalene,
2,6-dihydroxymethyl- and 1,5-dihydroxymethylnaphthalene,
6-hydroxymethyl-1-formyl naphthalene,
2-hydroxyethyl-1-ethylnaphthoate and 7-hydroxyethyl-1-methylnaphthoate,
8-hydroxymethyl-1-methylnaphthalene,
8-carboxy-1-ethylnaphthoate and 2-carboxy-1-propylnaphthoate,
8-methyl-1-carboxynaphthalene and 2-ethyl-1-carboxynaphthalene,
1,2-dicarboxynaphthalene and 1,8-dicarboxynaphthalene, as well as the carboxy salts and oxides among others.

While all of the above compositions inhibit the growth of fungi and yeasts, as in any large group of compounds, there are considerations which cause one or more of the entire group to be favored over the others. These considerations include the degree of activity, ease and cost of production, availability of starting materials and solubility.

On the basis of growth inhibition alone the hydroxyalkylnaphthoic acid esters and the hydroxynaphthoic acid esters are the desirable inhibitors. However, for agricultural use the hydroxynaphthoic acids and the dicarboxynaphthalenes and their carboxy salts and oxides are favored. These inhibitors being more water soluble can be formulated at lower costs than the other inhibitors of this invention.

Regardless of the nature of these substituents, it has been found that the 1,8- and 1,2-positions have the highest inhibiting activity of the compositions of this invention. For general fungal inhibition, the preferred inhibitors of this invention are the 1,8- and 1,2-hydroxyalkylnaphthoic acid esters. For agricultural use the esters of the 1,8- and 1,2-hydroxynaphthoic acids, the 1,8- and 1,2-hydroxynaphthoic acids and the 1,8- and 1,2-dicarboxy and dihydroxynaphthalenes and their carboxy salts as well as the metallic oxides are the preferred embodiments.

While there is no dearth of fungal inhibitors existing today, few of the commercially available inhibitors offer the advantages of being low in cost and ready availability, and few have activity against a broad spectrum of fungi and yeasts for extended periods of time.

The fungal and yeast growth inhibitors of this invention are advantageous in that they may be used to treat a wide variety of plant life to prevent fungal attack. By plant life is meant those materials including living plants, tubers, seeds, bushes, vegetables, and trees and the like. In addition, these inhibitors may be incorporated in paints, coatings, films, and polymers to protect inanimate materials such as fibers, plasticizers, plastics, wood, wood composition products, cutting oils, adhesives and the like. It has been estimated that losses from spoilage, decay, and corrosion resulting from fungal attack annually run into millions of dollars.

One of the areas of the economy where fungal and yeast attack is especially damaging is in agriculture. Particularly prone to rot caused by fungi are various crops of commercial importance such as tomatoes, melons, corn, peanuts, cucumber, bananas, and the like. These losses occur both during growth and after harvest in storage and transit. For example, the following fungi genera are causative factors in the diseases or infections listed:

| Microorganisms | Crop Affected | Percent Loss of Crop |
| --- | --- | --- |
| Alternaria | Tomato spot; Cantaloupe rot; Carrot blight; Cotton leaf spot. | 3-4%. |
| Fusarium | Banana rot | May go as high as 90% of shipment. |
|  | Corn and Sweet Potato rot. | 10% of crop after harvest. |
| Aspergillus | Corn seedling infection; Apple rot. | Considerable. |
| Rhizopus | Sugar Beet rot; Peanut disease. | Considerable. |

As can readily be seen, there is a real need for fungicides to control the causative fungi.

The applicants have found that when the inhibitors of the invention are applied to many crops during growth and after harvest, the growth of several of the fungi which are the causative factors in these losses can be substantially arrested. Particularly noteworthy is the finding that the applicants' compositions are effective in reducing the loss of fruit caused by *Fusarium roseum* (banana rot) in stored bananas. The control of this fungal infection is of significant commercial importance.

A second area of use where the fungal growth inhibitors of this invention are useful is in paints and coatings and the like to protect materials from mildew rot. Mildew caused "rot" is especially prevalent in tropical and sub-tropical areas where materials are exposed to periods of high humidity. Deterioration of materials is especially pronounced where permanent installations such as missile and air bases are exposed to heat and high humidity characteristic of tropical and subtropical areas. The inhibitors of this invention when incorporated into the coatings, paints and plasticizers and fabrics used in missiles, aircraft and their components can greatly arrest costly losses caused by fungal attack.

Many fibers under favorable environmental conditions of high heat and humidity are readily attacked by fungi. These include the general Chaetomium, Aspergillus, Penicillium, Fusarium, as well as various unidentified fungi and yeasts. The rot caused by this attack is popularly referred to as mildew. After the microorganism has fed upon the fiber, the tensile strength is greatly weakened and the fiber has a much "shorter life" expectancy. It has been found that incorporating small amounts of the inhibiting compositions into the fiber precursor will reduce the likelihood and severity of mildew attack upon synthetic fibers. Similarly, putting small quantities of the inhibitors into the finishing solutions will give natural fibers protection from fungal attack. In this way more resistant natural fibers such as cotton wool, silk, linens and the like can be produced. Aircraft missiles and their components can be given similar protection against mold and rot by incorporating these inhibitors into the plasticizers, paints and coatings where appropriate.

An ancillary but important advantage of these fungicides especially in agricultural use is that they can be made up as solid or liquid formulations. Examples of solid formulations are dusts, wettable powders, granules and pellets. Each of these may contain one or more of the specified isomers and an unresolved mixture of the isomers combined with a solid carrier or extender, ordinarily a non-reacting or inert substance such as clays, talcs, sawdust, flours, alkaline earth carbonates, oxides, phosphates and the like as well as diatomaceous earths, micas or similar suitable materials.

Where liquid formulations are desirable, liquid extenders, diluents, or carriers of a non-reactive nature are utilized. Examples of such materials are aliphatic alcohols, chlorocarbons, ketones and glycols, aromatic hydrocarbons, petroleum fractions and distillates among many others.

Where it is desired to use the aforementioned wettable powders, or liquid formulations either emulsified, dispersed or suspended in water or other fluid, one or more of a class of materials herein referred to as adjuvants may be incorporated into the powder, dust, or liquid formulation. These materials comprise surface active agents, detergents, wetting agents, solubilizing agents, stabilizers, dispersing agents, suspending agents, emulsifying agents, spreaders, stickers, and conditioning agents generally. Through their modifying characteristics, these materials facilitate handling and application, and not infrequently, enhance or potentiate the compositions of this invention in their anti-fungal activity by mechanisms frequently not well understood.

A satisfactory but not exhaustive list of these adjuvants appears among other places in "Soap and Chemical Specialties," volume 31, No. 7, page 61; No. 8, pages 48–61; No. 9, pages 52–67; and No. 10, pages 38–67 (1955). Also see Bulletin #607 of the Bureau of Entomology and Plant Quarantine of the United States Department of Agriculture.

An additional advantage of the compositions employed in the present invention is their compatibility with a variety of biocidal materials. For examples, it may frequently be convenient to combine one or more compositions of this invention with one or more adjuvants and carriers with pesticides and biocides of various structures. For example, one or more of the fungal inhibitors or an unresolved isomeric mixture of these inhibitors may be combined with insecticidal materials such as chlordane, benzene hexachlorides, DDT, DDD, the insecticidal carbamates, polychlorinated terpenes, the parathions, methoxychlor, insecticidal phosphates, phosphorothioates, and phosphorodithioates, with fungicides such as sulfur, quinones, didecylgaunidine, the metal dimethyldithiocarbamates, N-trihalomethylthio-4-chlorhexene-1,2-dicarboximide, N-(trichloromethylthio)phthalimide, heptadecylimidazoline, dinitrocapryl crotonate, and various fungicidal zinc, iron, nickel, manganese, copper, lead, and mercury salts.

Where agricultural use is contemplated the various water soluble and water insoluble carboxy salts and oxides are frequently advantageous.

For example, in areas of high humidity and high rainfall, water soluble salts are dissipated or leached out of the formulations before they can exert their beneficial effect. In these instances where water solubility is undesirable the carboxy salts or oxides such as calcium, barium, magnesium, strontium, lead, zinc, copper, iron, and the like are desirable.

However, in normal agricultural use the more water soluble carboxy salts and oxides are desirable. These include among others the alkali metal ammonium and substituted ammonium salts. Since the fungal and yeast growth inhibition arises from the di-substituted naphthalene moiety and not the particular salt, the nature of the salt used is immaterial. Thus the salts are considered to be a means of imparting the desired solubility to the molecule or a means of improving the ease of formulation. Recently the use of substituted ammonium salts of various fungicides have become favored for agricultural use because of their solubility and formulation characteristics. The use of these salts and oxides formed from the carboxy-and hydroxynaphthalenes would be advantageous.

Examples of these substituted ammonium salts include the mono-, di-, tri- and tetraalkylammonium such as methylammonium, ethylammonium, amylammonium, decylammonium, stearylammonium, dimethyl-, diethyl-, dipropyl-, dibutyl-, diamyl-, dioctyl-, didecyl-, distearylammonium, trimethyl-, triethyl-, tripropyl-, tributyl-, triamyl-, trioctyl-, trilaurylammonium, mono-, di-, and trialkanolammonium, including mono-, di-, and triethanolammonium, propanolammonium, butanolammonium, tetraalkylammonium, including tetramethylammonium, trimethyl-(2-chloroethyl)-ammonium, trimethyl-(2-hydroxyethyl)ammonium, also anilinium, N-methylanilinium, N,N - dimethylanilinium, pyridinium, N-laurylpyridinium, N-cetylpyridinium, morpholinium, N-methylmorpholinium, piperazinium, benzylammonium, cyclohexylammonium, hydrazinium, hydroxylammonium, and the like.

Another advantage of these fungal and yeast growth inhibitors is their low cost and ease of preparation. All of the mono- and dihydroxy, hydroxyalkyl, carboxynaphthalenes and their esters are well known compounds whose preparation and properties are presented among other places in Chemical Abstracts and in the exhaustive review by Donaldson, entitled "The Chemistry and Technology of Naphthalene Compounds," published by E. Arnold, 1958. Most of the salts are well known or are prepared by adding a slight excess over the stoichiometric amount of the base in water, ethanol, or acetone, to a solution of the acid naphthalene in water, ethanol, acetone or a mixture of these solvents. The esterifications are identical to well known synthetic organic procedures.

To further illustrate the workings of the inhibitors of this invention the following examples are submitted:

EXAMPLE I

*Determining Anti-Fungal Activity of Representative Compounds of This Invention Against Test Organisms*

EXPERIMENTAL

The following viable test fungi are treated as described below:

*Fusarium oxysporum*
*Fusarium roseum*
*Rhizopus nigricans*
*Aspergillus niger*
*Rhizopus stolonifer*
*Alternaria solani*

One loopful of the above viable fungi cultures, spores and mycelia is transferred from agar slants to 80 ml. portions of the nutrient broth given below.

| Component: | Percentage by wt. |
|---|---|
| Bacto-soytone | 1.0 |
| Bacto-dextrose | 4.0 |
| Deionized water, to volume. | |

The 80 ml. portion of the fungi and broth are placed on a sterile trypsinizing flask (300 ml.) and placed on a rotary shaker for 72 hours at room temperatures. At the end of this incubation time period, 20 ml. of the liquid is homogenized and placed into another sterile trypsinizing flask (300 ml.) containing 90 ml. of the above nutrient broth and 500 p.p.m. and 1000 p.p.m. respectively of the inhibitor being tested. The flasks are placed on a rotary shaker operating ta 240 r.p.m. at room temperature for three days. After this second incubation time the flasks are taken off and examined for visible fungal growth. Untreated controls are used as the basis of comparison.

RESULTS

The following chemicals gave substantially complete inhibition of fungal growth at 1000 p.p.m.:

6-hydroxymethyl-1-hydroxynaphthalene
5-hydroxy-1-carboxynaphthalene
1,2-dihydroxynaphthalene
8-formyl-1-hydroxynaphthalene
6-methyl-2-ethylnaphthoate
Sodium salt of 6-hydroxymethyl-2-carboxynaphthalene
2,6-dihydroxymethylnaphthalene
3-hydroxymethyl-2-formylnaphthalene
2-hydroxyethyl-1-ethylnaphthoate
8-carboxy-1-ethylnaphthoate
7-carboxy-1-propylnaphthoate
Ammonium salt of 2-ethyl-1-carboxynaphthalene
Dipotassium salt of 1,4-dicarboxynaphthalene

EXAMPLE II

*Anti-Fungal Activity of Representative Compounds of This Invention Against* Alternaria solani The following compositions are made up as 0.2 percent dispersions in water and each is sprayed on 25 tomato plants previously inoculated with early blight disease (*Alternaria solani*). An additional 25 tomato plants growing in the same area and similarly infected are left untreated as controls. Subsequent examination of the treated plants and the untreated controls shows substantially complete control in the treated plants while most of the untreated control plants developed severe symptoms of the disease.

Compositions applied:

2,6-dihydroxymethylnaphthalene
1,2-dihydroxynaphthalene
1,8-dimethylnaphthoate

EXAMPLE III

*Formulation of a Paint Having Anti-Mildew Properties*

The following ingredients are blended and ground together in the indicated proportions in a ball mill.

| Ingredient: | Pounds per 100 gallons |
|---|---|
| Gum rosin, grade W.W. | 277 |
| Blown fish oil | 118 |
| Zinc stearate | 18 |
| 6-hydroxymethyl-2-ethylnaphthoate | 197 |
| Zinc oxide | 161 |
| Magnesium silicate | 56 |
| Solvent naphtha | approx.[1] 241 |
| Lampblack | 1 |

[1] Volume adjusted to 100 gals. by the addition of naphtha.

EXAMPLE IV

*Anti-Mildew Paint Formulations*

The formulation of Example III is repeated except that the 1,8-dimethylnaphthoate is the active ingredient.

EXAMPLE V

*Another Formulation of a Paint Resistant to Mildew*

The following ingredients are blended together in the indicated proportions in a ball mill.

| Ingredient: | Pounds per 100 gallons |
|---|---|
| Rosin | 265 |
| Coal tar | 80 |
| Talc | 80 |
| Pine oil | 42 |
| 1,2-diethylnaphthoate | 200 |
| High flash naphtha and mineral spirits, made up to volume. | |

EXAMPLE VI

*Anti-Mildew Paint Formulations—Continued*

The formulation from Example V is used except that the 6-formyl-2-ethylnaphthoate is used as active ingredient.

EXAMPLE VII

*Preparation of a Vinyl Coating Resistant to Mildew Deterioration*

A vinyl coating is prepared using a commercially available preparation not containing a fungi or yeast growth inhibitor.

An identical vinyl coating is prepared except that 1% by weight of 2,6-dihydroxymethylnaphthalene is incorporated into the formulation.

Two sets of missile components such as asbestos tubing, silk wrapped transformers and rayon wrapped solenoids are obtained. One set is sprayed with the vinyl coating containing inhibitor, the other with the identical coating without inhibitor.

EXAMPLE VIII

*Preparation of Plasticizers Resistant to Mildew*

A commercial thermoplastic monomer is divided into four portions which are treated as follows:

*Portion 1.*—To this portion are added 2% by weight of 6-hydroxymethyl-2-ethylnaphthoate and 10% by weight of dimethylphthalate as plasticizer. The monomer is polymerized and molded into a 2-inch diameter disc, ¼ inch in thickness prior to testing.

*Portion 2.*—To this portion are added 2% by weight of 6-hydroxymethyl-2-ethylnaphthoate and 10% by weight of butyl isodecylphthalate as plasticizer. The monomer is polymerized and molded as above.

*Portion 3.*—This portion is the untreated control of Portion 1 containing no fungal inhibitor but 10% by weight of dimethylphthalate as plasticizer. Again the polymerization and molding are identical.

*Portion 4.*—This portion is the untreated control of Portion 2 containing no fungal inhibitor but 10% by weight of butyl isodecylphthalate as plasticizer. The polymerization and molding are as described above.

The two plasticizers are chosen on the basis of their known susceptibility to Fusarium attack under high humidity and temperature conditions.

EXAMPLE IX

*Evaluation of the Paint Formulations, Vinyl Coatings and Plasticizers for Mildew and Fungi Resistance*

A. The paint formulations from Examples III to VI are painted on steel test panels which are allowed to dry and are then placed in an air-tight high temperature and humidity chamber maintained at 80° F. and 95% humidity to simulate tropical temperature and humidity conditions. At the same time, steel test panels painted with the untreated control formulations are also placed in the same chamber.

B. The vinyl coated articles of Example VII, both controlled and treated, are placed in an identical heat and humidity chamber kept at the same conditions.

C. The four discs of Example VIII made as previously described are placed in a third high temperature and humidity chamber similar to the two described.

RESULTS

A. After a one month test period the control paint panels are found to be coated with various fungi including Fusarium and Aspergillus species and are discolored. The treated painted panels were unaffected.

B. After a month's exposure the vinyl coated articles treated with inhibitor are only slightly attacked by rot while the articles coated with vinyl without inhibitor are rotted through.

C. After a month of testing the two untreated control discs are examined and are found to be blackened and rotted. Isolates of Aspergillus and Fusarium of unknown species are prepared from the deteriorated discs. The two sets of two discs containing fungal inhibitor are not adversely affected.

EXAMPLE X

*Evaluation of Inventive Compositions as Mildew Retardants in Cotton*

The tests are run under conditions similar to those described in detail in Method 5762, "Mildew Resistance of Cloth; Soil Burial Method," of Federal Specification CCC–T–191, "Textile Test Methods."

Standard "blue-line" cotton duck fabric (3″ x 3″) is impregnated with one percent solutions of the inventive compositions calculated on the dry weight of the fabric. The fabric is cut in three 1″ x 3″ strips which are raveled and buried vertically using spuds. At the same time an identical piece of 3″ x 3″ cotton duck fabric untreated for control purposes is buried using the same techniques and location. At the end of five days' burial, the two groups of buried cotton are removed and tested for loss of breaking strength as compared to unburied controls.

Cloth treated with the following compounds requires at least 50% more force to break than the untreated controls:

1,8-dihydroxymethylnaphthalene
    1,2-diethylnaphthoate
    6-formyl-2-ethylnaphthoate

We claim:

1. A method of protecting a material normally subject to attack by fungi and yeasts, comprising applying to said material a fungi-growth inhibiting amount of a di-substituted naphthalene in which the substituent pairs are selected from the group consisting of hydroxy-hydroxyalkyl, hydroxy-carboxy, hydroxy-formyl, hydroxy-alkyl ester, hydroxy-alkyl, dihydroxy, dihydroxyalkyl, hydroxyalkyl-carboxy, hydroxyalkyl-formyl, hydroxyalkyl-alkyl ester, hydroxyalkyl-alkyl, carboxy-alkyl ester, formyl-alkyl ester, carboxy-alkyl, dicarboxy and the corresponding oxides and carboxy salts, said alkyl, hydroxyalkyl and carboxy substituents each having from 1 to 6 carbon atoms.

2. The method of claim 1 wherein the di-substituted naphthalene substituent pair is hydroxy-hydroxyalkyl.

3. The method of claim 1 wherein the di-substituted naphthalene substituent pair is hydroxyalkyl-alkyl ester.

4. The method of claim 1 wherein the di-substituted naphthalene substituent pair is hydroxyalkyl-formyl.

5. The method of claim 1 wherein the disubstituted naphthalene substituent pair is formyl-alkyl ester.

6. The method of claim 1 wherein the di-substituted naphthalene substituent pair is hydroxy-alkyl ester.

7. The method of claim 1 wherein the di-substituted naphthalene substituent pair is carboxy-hydroxyalkyl.

8. The method of claim 1 wherein the di-substituted naphthalene substituent pair is hydroxyalkyl-hydroxyalkyl.

9. The method of claim 1 wherein the di-substituted naphthalene substituent pair is 6-hydroxy-2-ethylnaphthoate.

10. The method of claim 1 wherein the di-substituted naphthalene substituent pair is 2,6-dihydroxy-methylnaphthalene.

11. The method of claim 1 wherein the di-substituted nphthalene substituent pair is 6-formyl-2-ethylnaphthoate.

12. The method of claim 1 wherein the di-substituted naphthalene substituent pair is 1,2-dicarboxy-naphthalene, disodium salt.

13. A method of protecting material from mildew causative microorganisms comprising applying to said material a mildew inhibitory amount of a di-substituted naphthalene in which the substituent pairs are selected from the group consisting of hydroxy-hydroxyalkyl, hydroxy-carboxy, hydroxy-formyl, hydroxy-alkyl ester, hydroxy-alkyl, dihydroxy, dihydroxyalkyl, hydroxyalkyl-carboxy, hydroxy-alkyl-formyl, hydroxyalkyl-alkyl ester, hydroxyalkyl-alkyl, carboxy-alkyl ester, formyl-alkyl ester, carboxy-alkyl, dicarboxy and the corresponding oxides and carboxy salts, said alkyl, hydroxy-alkyl and carboxy substituents each having from 1 to 6 carbon atoms.

14. A method of protecting plant-life from fungi which comprises applying to the locus of the plant-life to be protected, a fungi-growth inhibiting amount of a di-substituted naphthalene in which the substituent pairs are selected from the group consisting of hydroxy-hydroxyalkyl, hydroxy-carboxy, hydroxy-formyl, hydroxy-alkyl ester, hydroxy-alkyl, dihydroxy, dihydroxyalkyl, hydroxyalkyl-carboxy, hydroxyalkyl-formyl, hydroxyalkyl-alkyl ester, hydroxyalkyl-alkyl, carboxy-alkyl ester, formyl-alkyl ester, carboxy-alkyl, dicarboxy and the corresponding oxides and carboxy salts, said alkyl, hydroxyalkyl and carboxy substituents each having from 1 to 6 carbon atoms.

15. A coating composition resistant to attack by mildew causative microorganisms comprising a major amount of inert vehicle, filler and pigment and a minor amount of a di-substituted naphthalene substituent in which the substituent pairs are selected from the group consisting of hydroxy-hydroxyalkyl, hydroxy-carboxy, hydroxy-formyl, hydroxy-alkyl ester, hydroxy-alkyl, dihydroxy, dihydroxyalkyl, hydroxyalkyl-carboxy, hydroxyalkyl-formyl, hydroxy-alkyl-alkyl ester, hydroxyalkyl-alkyl, carboxy-alkyl ester, formyl-alkyl ester, carboxy-alkyl, dicarboxy and the corresponding oxide and carboxy salts, said minor amount of di-substituted naphthalene being present in a mildew growth inhibiting concentration, said carboxy, hydroxyalkyl and alkyl substituent each having from 1 to 6 carbon atoms.

16. A material normally subject to fungal attack having applied thereto a fungi-growth inhibiting amount of a di-substituted naphthalene in which the substituent pairs are selected from the group consisting of hydroxy-hydroxyalkyl, hydroxy-carboxy, hydroxy-formyl, hydroxy-alkyl ester, hydroxy-alkyl dihydroxy, dihydroxyalkyl, hydroxyalkyl-carboxy, hydroxyalkyl-formyl, hydroxyalkyl-alkyl ester, hydroxy-alkyl-alkyl, carboxy-alkyl ester, formyl-alkyl ester, carboxy-alkyl, dicarboxy, and the corresponding oxides and carboxy salts, said alkyl, hydroxy-alkyl and carboxy substituents each having from 1 to 6 carbon atoms.

References Cited in the file of this patent

UNITED STATES PATENTS

| | | |
|---|---|---|
| 2,589,223 | Burtner | Mar. 18, 1952 |
| 2,938,828 | Van der Waarden et al. | May 31, 1960 |

OTHER REFERENCES

Horsfall: "Fungicides and Their Action," Chronica Botanica Company, Waltham, Mass., 1945, pp. 143–144.